US012683373B2

(12) United States Patent
Behr

(10) Patent No.: US 12,683,373 B2
(45) Date of Patent: Jul. 14, 2026

(54) PORTABLE LIGHTNING PROTECTION SYSTEM BASE ASSEMBLY AND METHOD OF USING SAME

(71) Applicant: LBA Group, Inc., Greenville, NC (US)

(72) Inventor: Lawrence Behr, Greenville, NC (US)

(73) Assignee: LBA Group, Inc., Greenville, NC (US)

( * ) Notice: Subject to any disclaimer, the term of this patent is extended or adjusted under 35 U.S.C. 154(b) by 239 days.

(21) Appl. No.: 18/602,335

(22) Filed: Mar. 12, 2024

(65) Prior Publication Data

US 2024/0313518 A1     Sep. 19, 2024

Related U.S. Application Data

(60) Provisional application No. 63/452,470, filed on Mar. 16, 2023.

(51) Int. Cl.
*E04H 12/16*          (2006.01)
*H02G 13/00*          (2006.01)
(52) U.S. Cl.
CPC ................................... *H02G 13/80* (2013.01)
(58) Field of Classification Search
CPC ................................. H02G 13/80; E04H 12/16
See application file for complete search history.

(56) References Cited

U.S. PATENT DOCUMENTS

|  433,459 A | 8/1890 | Ferrell |
| 2,186,300 A | 1/1940 | Lamar |

(Continued)

FOREIGN PATENT DOCUMENTS

| CN | 203503977 U | 3/2014 |
| CN | 204304221 U | 4/2015 |

(Continued)

OTHER PUBLICATIONS

LBA Group portable lightning mast, published on (Aug. 1, 2016) on facebook.com, retrieved from internet (Jun. 5, 2025). <URL: https://www.facebook.com/LBAGroup/photos/pb.100063568976586.-2207520000/1253516914658317/> (Year: 2016).

(Continued)

*Primary Examiner* — Scott Bauer
(74) *Attorney, Agent, or Firm* — Ward and Smith, P.A.; Ryan K. Simmons

(57)                    ABSTRACT
A base assembly for a portable lightning protection system. The base assembly may include an outer base structure, and a plurality of outer horizontal beams attached to one another in an end to end configuration forming a generally closed outer base structure; an inner base structure, the inner base structure may include a plurality of inner horizontal support brackets attached in an end to end configuration forming a generally closed inner base structure, wherein the inner base structure may be formed about a central connection point of the base assembly; radially extending inner horizontal beams each having a first end attachable to a corner region of the outer base structure formed where corresponding ends of two of the plurality of outer horizontal members are attached together, and a second end attachable to one of the central connection point of the base assembly or to one of the inner horizontal support brackets of the inner base structure; and a plurality of angled support members each having a first end attachable to one of the radially extending inner horizontal beams and a second end attachable to a base mast section attachable to the base assembly.

19 Claims, 5 Drawing Sheets

(56) References Cited

U.S. PATENT DOCUMENTS

| | | | |
|---|---|---|---|
| 4,447,847 A | 5/1984 | Drulard | |
| 4,824,291 A | 4/1989 | Coppens | |
| 5,159,521 A | 10/1992 | Guangrun et al. | |
| 5,979,844 A | 11/1999 | Hopkins | |
| 6,369,317 B1 | 4/2002 | Rapp | |
| 6,692,142 B1 | 2/2004 | Gordin et al. | |
| 6,875,915 B1 | 4/2005 | Chung | |
| 6,930,239 B1 | 8/2005 | Chen | |
| 6,943,285 B2 | 9/2005 | Chung | |
| 7,789,574 B2 | 9/2010 | Broberg | |
| 7,960,647 B2 | 6/2011 | Rizk et al. | |
| 8,373,065 B2 | 2/2013 | Azuma | |
| 9,083,172 B2 | 7/2015 | Behr | |
| 9,410,332 B2 * | 8/2016 | Patton | E04G 5/001 |
| D831,852 S | 10/2018 | Nguyen | |
| 10,916,928 B2 | 2/2021 | Behr | |
| 2011/0006174 A1 | 1/2011 | Hollinger | |
| 2014/0262410 A1 | 9/2014 | Behr | |
| 2017/0244234 A1 | 8/2017 | Behr | |
| 2018/0212414 A1 | 7/2018 | Behr | |
| 2022/0380006 A1 * | 12/2022 | Cobián Babé | F03D 13/25 |
| 2024/0313518 A1 | 9/2024 | Behr | |

FOREIGN PATENT DOCUMENTS

| | | | |
|---|---|---|---|
| DE | 202008001258 U1 | 3/2008 | |
| EP | 2099109 A1 | 9/2009 | |
| JP | 2000-077199 A | 3/2000 | |
| KR | 100539704 B1 | 12/2005 | |
| WO | 2016/000992 A1 | 1/2016 | |
| WO | 2017/143196 A1 | 8/2017 | |
| WO | 2019/190458 A1 | 10/2019 | |

OTHER PUBLICATIONS

LBA Lighting Mast, published on (Feb. 29, 2020) on web.archive. org, retrieved from internet (Jun. 5, 2025). <URL: https://web. archive.org/web/20200229191821/https://www.lbagroup.com/products/ lightning-protection-dissipaters-portable-masts-rods> (Year: 2020).

International Preliminary Report and Written Opinion received for PCT Patent Application No. PCT/US2017/018378, mailed on May 11, 2017, 14 pages.

International Preliminary Report on Patentability received for PCT Patent Application No. PCT/US2017/018378, mailed on Aug. 30, 2018, 13 pages.

International Search Report and Written Opinion received for PCT Patent Application No. PCT/US18/24331, mailed on Jun. 11, 2018, 8 pages.

* cited by examiner

PORTABLE LIGHTNING PROTECTION SYSTEM BASE ASSEMBLY AND METHOD OF USING SAME

RELATED APPLICATIONS

This application is related and claims priority to U.S. Provisional Patent Application No. 63/452,470, filed on Mar. 16, 2019 the application of which is incorporate herein by reference in its entirety.

TECHNICAL FIELD

The subject matter of the present invention relates generally to a lightning protection system. In particular to a base assembly for a portable lightning protection system.

SUMMARY

In one embodiment, a base assembly for a portable lightning protection system is provided. The base assembly may include an outer base structure, and a plurality of outer horizontal beams attached to one another in an end to end configuration forming a generally closed outer base structure; an inner base structure, the inner base structure may include a plurality of inner horizontal support brackets attached in an end to end configuration forming a generally closed inner base structure, wherein the inner base structure may be formed about a central connection point of the base assembly; radially extending inner horizontal beams each having a first end attachable to a corner region of the outer base structure formed where corresponding ends of two of the plurality of outer horizontal members are attached together, and a second end attachable to one of the central connection point of the base assembly or to one of the inner horizontal support brackets of the inner base structure; and a plurality of angled support members each having a first end attachable to one of the radially extending inner horizontal beams and a second end attachable to a base mast section attachable to the base assembly. The generally closed outer base structure may include a generally hexagonal shape. The generally closed inner base structure may include a generally triangular shape. The radially extending inner horizontal beams, may include a first set of radially extending inner horizontal beams and a second set of radially extending inner horizontal beams, wherein the second ends of the first set of inner horizontal beams may be attachable to the central connection point, and the second ends of the second set of inner horizontal beams may be attachable to the plurality inner horizontal support brackets of the inner base structure. The second ends of the second set of inner horizontal beams may be attachable to about a center point of the inner horizontal support brackets. The second end of the angled support members may be attachable to radially projecting fins of the base mast section. The plurality of outer horizontal beams may include six outer horizontal beams, and wherein the plurality of radially extending inner horizontal beams may include six inner horizontal beams. Each horizontal beam of the second set of radially extending inner horizontal beams may be disposed substantially perpendicular to the inner horizontal support bracket to which it is attached to. The first set of radially extending inner horizontal beams may be disposed in an alternating pattern with the second set of radially extending inner horizontal beams. Each of the inner horizontal support brackets may extend between adjacent horizontal beams of the radially extending inner horizontal beams. The base mast section may be attachable to the base assembly via a hinge assembly, wherein the hinge assembly may include a top horizontal plate and a bottom horizontal plate, wherein the top horizontal plate and the bottom horizontal plate may be hingedly connected on at least one side thereof. The base mast section may be attachable to the top horizontal plate of the hinge assembly. The plurality of angled support members may include three angled support members. The plurality of angled support members may include six angled support members. Three of the six angled support members may be attachable to radially projecting fins formed on the base mast section, and the other three of the six angled support members may be attachable to the base mast section between adjacent ones of the radially projecting fins. Each of the plurality of angled support members may be at about a 45 degree angle relative to the base mast section and the inner horizontal member to which it is attached. The system may further include quick connect/disconnect fasteners for attachment of one or more of the plurality of outer horizontal beams, plurality of inner horizontal support brackets, radially extending inner horizontal beams, and/or angled support members.

In another embodiment, a method of deploying a base assembly for a portable lightning protection system is provided. The method may include providing a base assembly for a portable lightning protection system. The base assembly may include an outer base structure, and a plurality of outer horizontal beams attached to one another in an end to end configuration forming a generally closed outer base structure; an inner base structure, the inner base structure may include a plurality of inner horizontal support brackets attached in an end to end configuration forming a generally closed inner base structure, wherein the inner base structure may be formed about a central connection point of the base assembly; radially extending inner horizontal beams each having a first end attachable to a corner region of the outer base structure formed where corresponding ends of two of the plurality of outer horizontal members are attached together, and a second end attachable to one of the central connection point of the base assembly or to one of the inner horizontal support brackets of the inner base structure; and a plurality of angled support members each having a first end attachable to one of the radially extending inner horizontal beams and a second end attachable to a base mast section attachable to the base assembly. The method may further include, assembling the base assembly; connecting the base mast section to the base assembly via the hinge assembly; positioning the base assembly to a desired location and securing in position; grounding the lightning protection system; and placing and securing sections of a multi-section conductive mast assembly in an upright position. Positioning the base assembly to a desired location and securing in position may be done prior to connecting the base mast section to the base assembly via the hinge assembly. The base assembly may be assembled using quick connect/disconnect fasteners.

BACKGROUND

Lightning terminals or "lightning rods" are commonly attached to numerous structures such as buildings, cell towers, drilling rigs, and tanks. Generally, these terminals are attached to the highest part of the structure and grounded. Lightning will strike the terminal instead of the structure and follows the least path of resistance to the ground. However, many portable and high value assets are not protected from lightning strikes. Such assets include, for example, portable buildings, airfields, aircraft, ground vehicles, pumping stations, fuel depots, emergency and military command posts, solar cell installations, satellite dish installations, environmental monitoring facilities, etc. These portable and high value assets may be in temporary areas and/or areas that do not allow for a lightning protection system to be quickly and easily anchored in place. Thus, there is a need for a base assembly for a portable lightning protection system that can quickly and easily secure/anchor the portable lightning protection system in place.

BRIEF DESCRIPTION OF THE DRAWINGS

Figure 1:
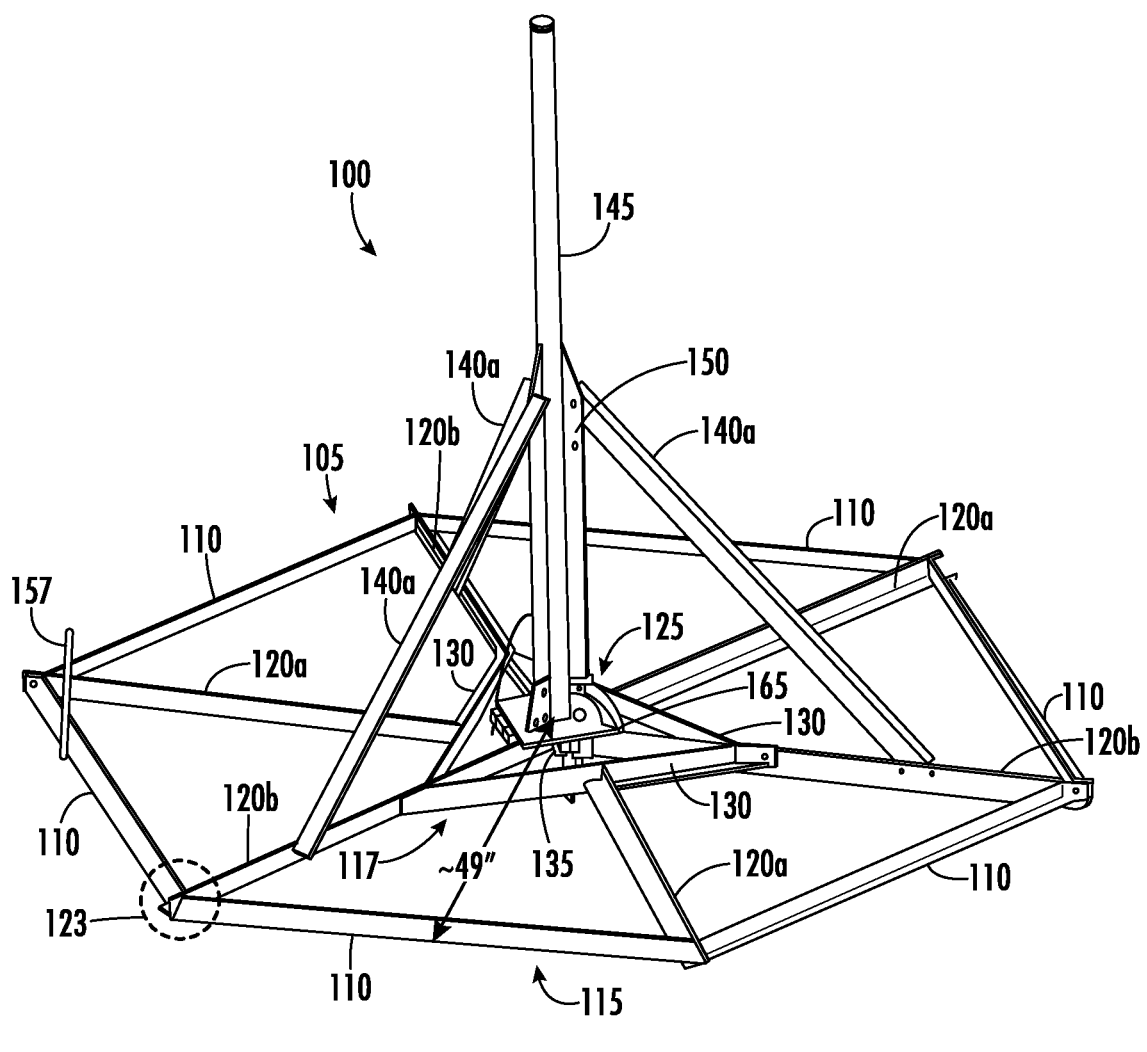
Figure 2:
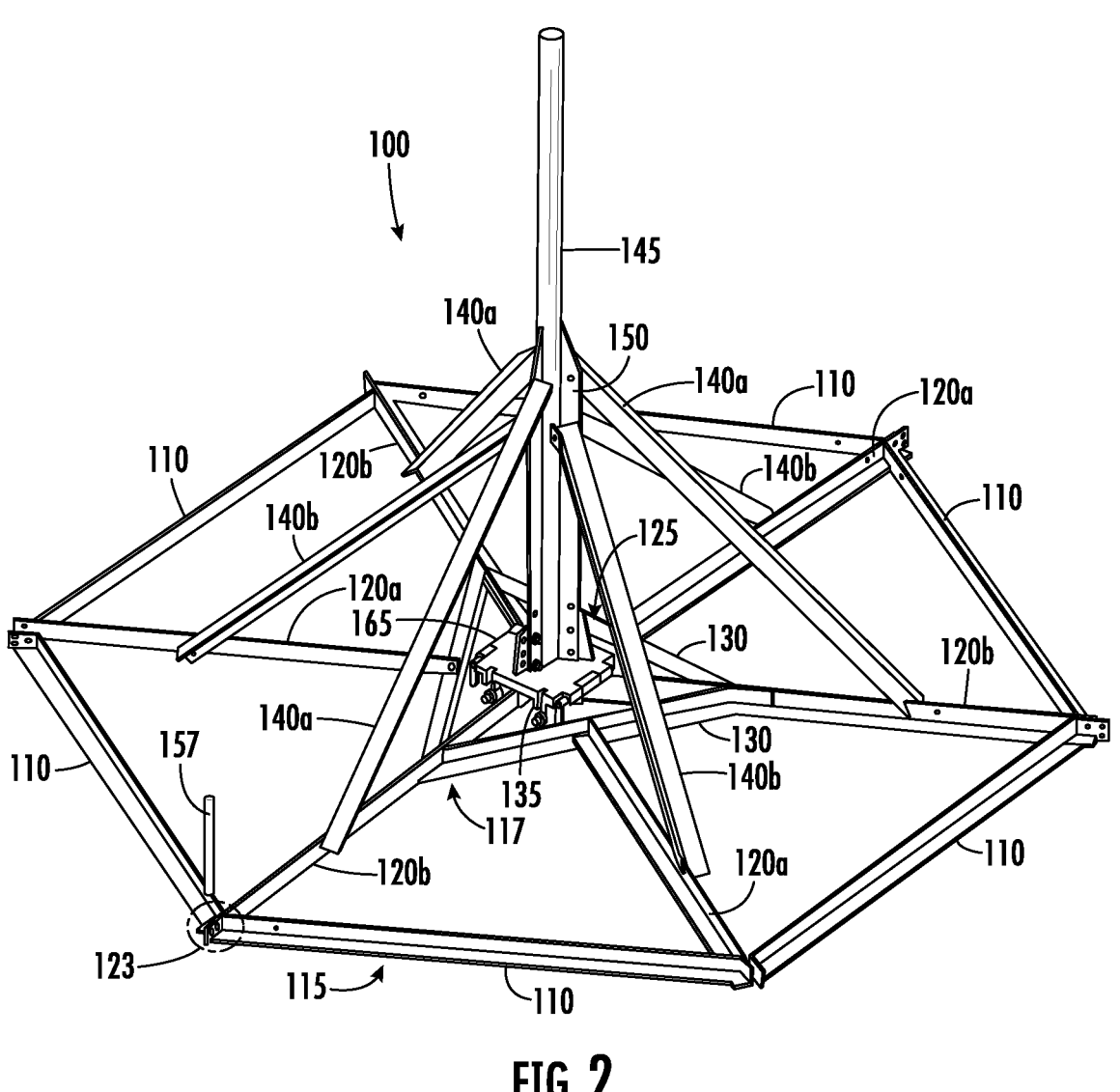
Figure 3:
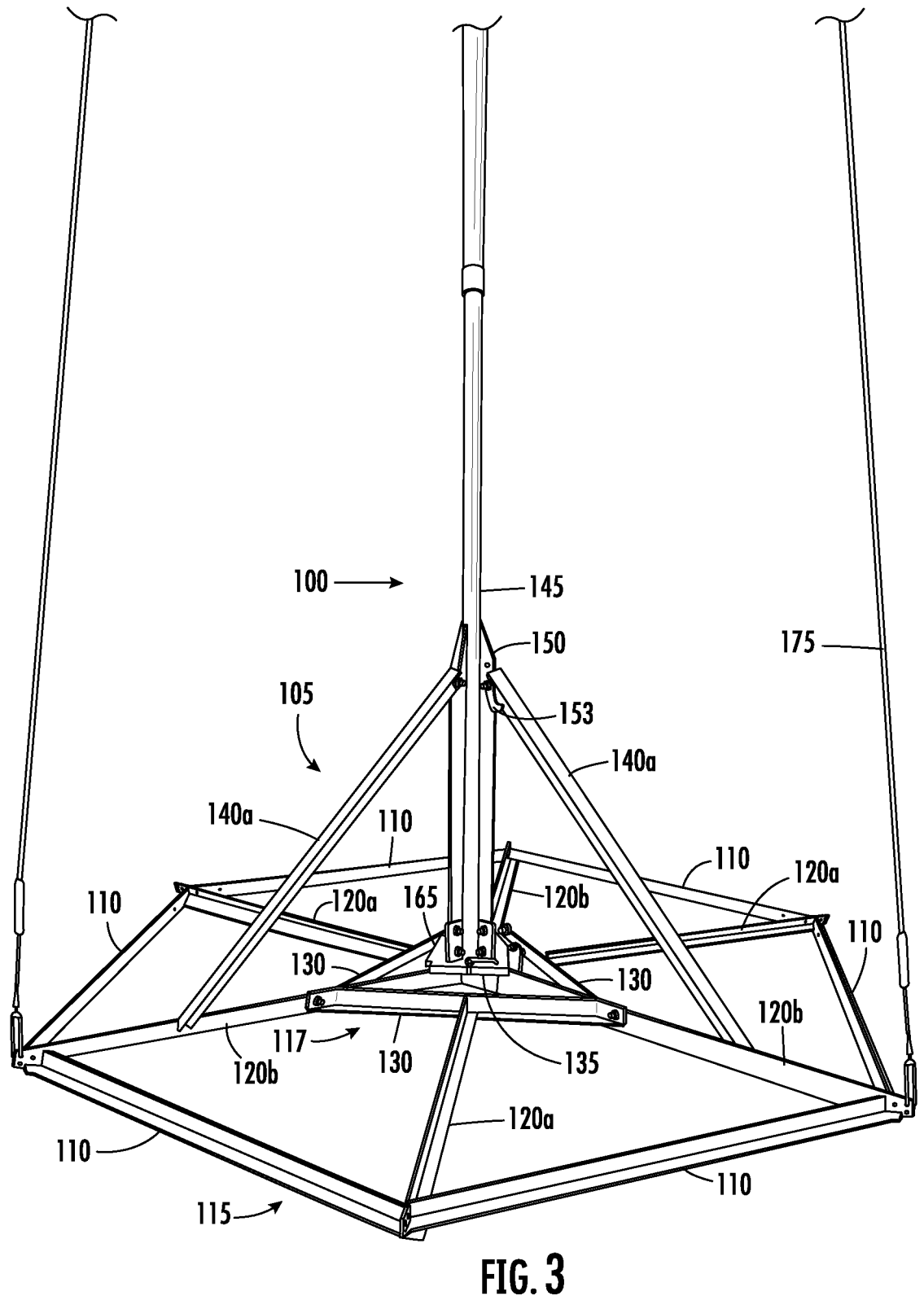
Figure 4:
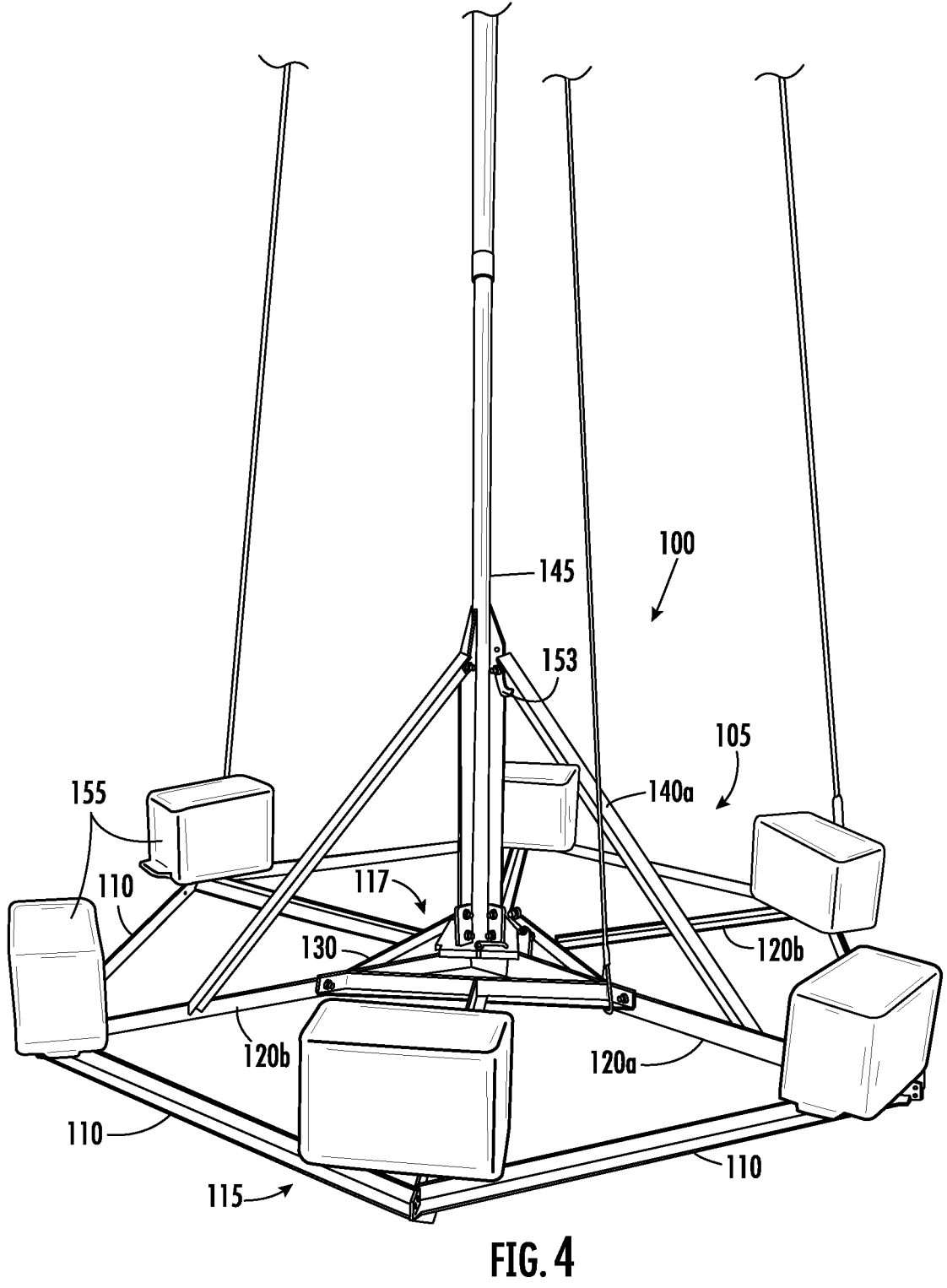
Figure 5:
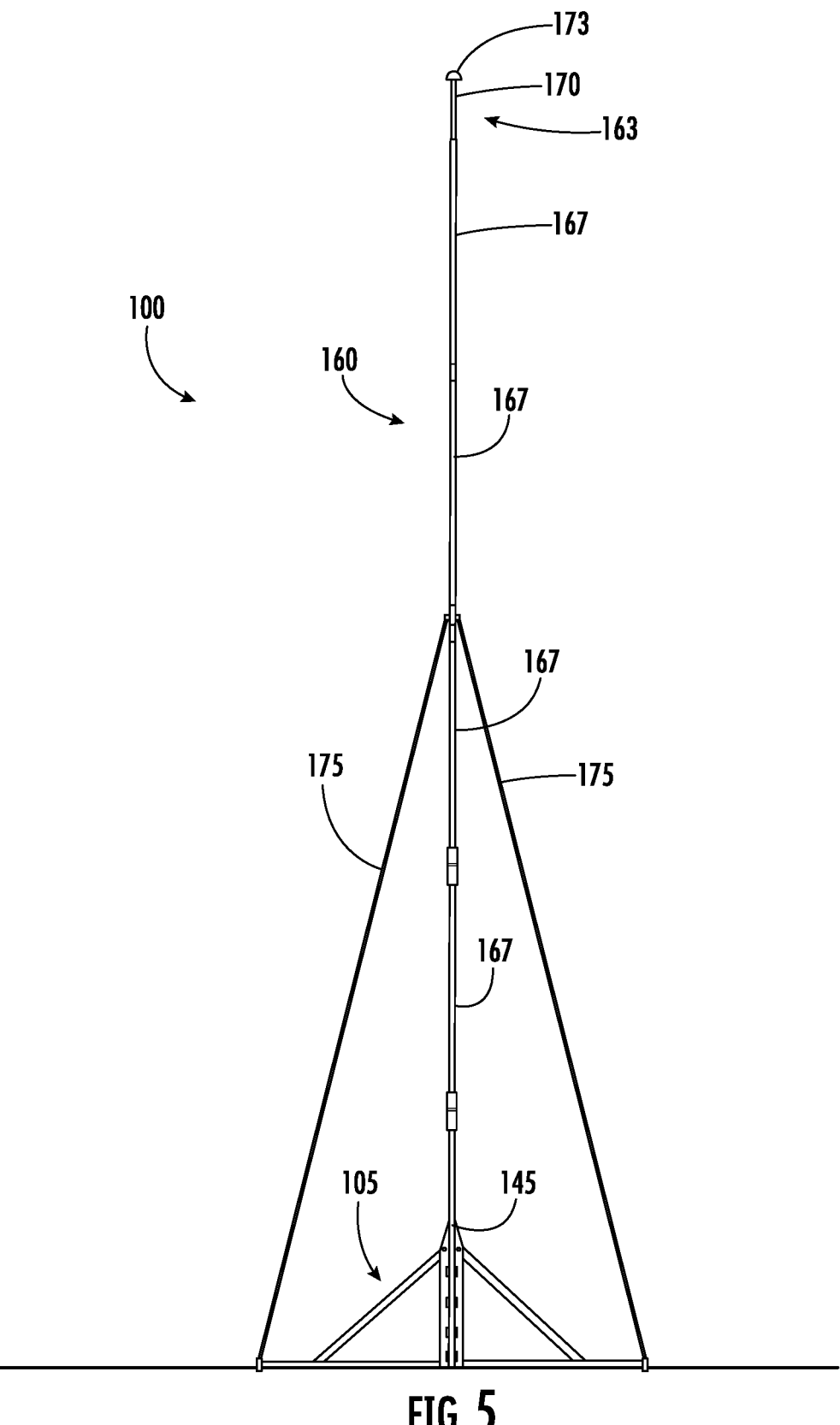

Having thus described the subject matter of the present invention in general terms, reference will now be made to the accompanying drawings, which are not necessarily drawn to scale, and wherein:

FIG. 1 illustrates a perspective view of an example of a base assembly for a portable lightning protection system, in accordance with an embodiment of the invention;

FIG. 2 illustrates a perspective view of an example of a base assembly for a portable lightning protection system, in accordance with an embodiment of the invention;

FIG. 3 illustrates another perspective view of the example base assembly for a portable lightning protection system, in accordance with an embodiment of the invention;

FIG. 4 illustrates another perspective view of the example base assembly for a portable lightning protection system with water-ballast bricks, in accordance with an embodiment of the invention; and FIG. 5 illustrates a side view of an example portable lightning protection system with a base assembly, in accordance with an embodiment of the invention.

DETAILED DESCRIPTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated Drawings. Therefore, it is to be understood that the subject matter of the present invention is not to be limited to the specific embodiments disclosed and that modifications and other embodiments are intended to be included within the scope of the appended claims.

In some embodiments, the subject matter of the invention provides a base assembly for a portable lightning protection system.

Referring now to FIGS. 1-5, illustrate various example embodiments of a base assembly 105 for a portable lightning protection system 100 in accordance with embodiments of the invention. The base assembly 105 may include outer horizontal members 110, wherein the ends of the outer horizontal members 110 may be connected one to the next to form an outer base 115 of the base assembly 105. In one non-limiting example, base assembly 105 may be in the range of about nine (9) feet to about ten (10) feet across in width, for example, about 9 feet 6 inches. In one non-limiting example, outer base 115 may include six (6) outer horizontal members 110, wherein the ends of the outer horizontal members 110 may be connected one to the next to form the outer base 115, which in one example may be a generally hexagonal structure. The base assembly 105 may further include a number of inner horizontal members 120 (120a, 120b), for example, but not limited to, six (6). In one example, a first end of each of the inner horizontal members 120 may connect to a corner region 123 of the outer base 115 formed where the ends of two outer horizontal members 110 are connected together. A second end of one or more of the inner horizontal members 120 may extend inward toward a central region 125 of the base assembly 105; and in some embodiments, one or more of the second ends of one or more of the inner horizontal members 120 (i.e., 120b), may connect to a central connection point 135 disposed at the central region 125.

The base assembly 105 may further include inner support brackets 130. In one example, the inner horizontal support brackets 130 may be configured in an end to end configuration to form an inner base 117 that forms a generally triangular shape about the central region 125 of the base assembly 105.

In one example, some number of the inner horizontal members 120 (i.e., 120b), e.g., every other one, may connect at their second end to the central connection point 135, and the other ones of the inner horizontal members 120 (i.e., 120a), may connect at their second end to about a center point of one or more of the inner horizontal support brackets 130, wherein each of the inner horizontal members 120a connected thereto may be generally perpendicular to the inner horizontal support bracket 130 to which it is connected. In one example, every other one of the inner horizontal members 120 (i.e., 120b) connect, at their second end, to the central connection point 135, and every other one of the other inner horizontal members 120 (i.e., 120a) connect, at their second end, to about the center point of one of the inner horizontal support brackets 130. In such an example, each of the inner horizontal support brackets 130 may span from a generally upper region of one of the inner horizontal members 120 (i.e., 120b) that connect to the central connection point 135 to a generally upper region of an adjacent one of the inner horizontal members 120 (i.e., 120b) that connect to the central connection point 135, and wherein another one of the inner horizontal members 120 (i.e., 120a) extends from about a center point of that inner horizontal support bracket 130 perpendicularly outward to its corresponding corner region 123.

The base assembly 105 may further include angled support members 140 (140a, 140b). The angled support members 140 may connect, at a first end, to one or more of the inner horizontal members 120, for example, at about a mid-point of the inner horizontal members 120, and may connect, at their second end, to a section of a mast assembly of the portable lightning protection system 100, e.g., to base mast section 145. In one example, the base mast section 145 may include radially projecting fins 150, and in such an example, the second ends of the angled support members 140 (i.e., 140a) may connect to the radially projecting fins 150. In one example, the second ends of one or more of the angled support members 140 (i.e., 140a) may connect to the radially projecting fins 150 and/or one or more of the angled support members 140 (i.e., 140b) may connect to the base mast section 145 itself. In one non-limiting example, the base assembly 105 may include three (3) angled support members 140 (i.e., 140*a*) connected, for example, between the radially projecting fins 150 of the base mast section 145 at their second end and to the inner horizontal members 120 (i.e., 120*b*) at their first end. In another non-limiting example, the base assembly 105 may include six (6) angled support members 140 (140*a*, 140*b*), wherein three (3) of the six (6) angled support members 140 (i.e., 140*a*) may be connected between the radially projecting fins 150 of the base mast section 145 at their second end and to the inner horizontal members 120 (i.e., 120*b*) at their first end, and the other three (3) of the six (6) angled support members 140 (i.e., 140*b*) may be connected between the base mast section 145 itself at their second end and to the inner horizontal members 120 (i.e., 120*a*) at their first end. In one example, the angled support members 140 (140*a*, 140*b*) may be at about a 45 degree angle relative to the base mast section 145 and the inner horizontal members 120 to which they are connected.

| | Length (in the range of about) | Width (about) |
|---|---|---|
| outer horizontal members 110 | 55"-56" (e.g., 55.57") | 2" |
| inner horizontal members 120a | 45"-47" (e.g., 46") | 2" |
| inner horizontal members 120b | 55"-56" (e.g., 55⅜") | 2" |
| inner horizontal support brackets 130 | 38"-39" (e.g., 38⅞") | 2" |
| angled support members 140a | 51"-53" (e.g., 52") | 2" |
| angled support members 140b | 48"-49" (e.g., 48⁷⁄₁₆") | 2" |

Example Component Dimensions (Non-Limiting)

The outer horizontal members 110, the inner horizontal members 120, the inner horizontal support brackets 130, and the angled support members 140 may be, for example, aluminum or aluminum alloy, or any other suitable material.

All fasteners and installation hardware of the lightning protection system 100 may preferably be, for example, captive for fast installation and to avoid loose parts that could cause foreign object contamination and/or damage at sensitive sites. Preferably no, or only minimal, tools are required for installation. For example, some of the base members that have hinge points may have double nut bolts and wave washers that do not require any attention by the operator during assembly. However, any other suitable mechanism may be used. Some or all of the mechanical attachment points may be accomplished, for example, by slots in one attaching piece and a captive cam lever fastener in the other piece. However, any other suitable quick connect/disconnect mechanism may be used. For example, FIGS. 3 and 4 show some examples of a cam lever fastener system 153. The lightning protection system 100 may include several cam lever fasteners 153 so that the various components can be connected/disconnected, and thereby assembling/disassembling modular lightning protection system 100 with minimal, or no tools.

FIG. 4 illustrates an example of a base assembly 105, including ballasts 155, which may be, in one non-limiting example, water-ballast bricks. One or more ballasts 155 may be positioned at one or more of corner sections 123, and may be supported by one or more ballast supports 157 (as shown for example in FIGS. 1 and 2). Ballasts 155, may provide weight to the base assembly 105 of the lightning protection system 100. However, other mechanisms, such as sand bags, blocks, weights, and the like, may be used to add weight to the base assembly 105. In one example, the ballasts 155, e.g., water-ballast bricks, may hold about 3.5 gallons of water and have a weight of about 32 lbs. Accordingly, ground penetration is not necessarily required to anchor the erected lightning protection system 100. Therefore, the lightning protection system 100 may be used on most any ground surface and/or potentially on top of a building structure.

FIG. 5 illustrates an example of a portable lightning protection system 100, including a mast assembly 160 and an air terminal 163 supported in base assembly 105. Base assembly 105 may be used with any number of lightning protection systems, such as, but not limited to, that shown and described in U.S. Pat. Nos. 10,763,657 and 10,916,928, the disclosures of which are incorporated herein by reference in their entireties.

In one example, mast assembly 160 may be hingeably coupled to base assembly 105 at a bottom of base mast section 145 via a hinge assembly 165. The mast assembly 160 may include a plurality of mast sections 167 that may be coupled end-to-end. In one example, the mast sections 167 may be coupled end-to-end via threaded couplers (not shown). However, the mast sections 167 may be coupled together via any suitable mechanism and/or technique. The cross-sectional diameter of the mast assembly 160 may vary from larger to smaller from bottom to top. Accordingly, there may be a certain order of the mast sections 160. The base mast section 145 and the mast sections 167 of the mast assembly 160 may be formed, for example, of lightweight, rugged, aluminum alloy, or other suitable material.

Further, an air terminal 163 may be installed at the uppermost end of the mast assembly 160. The air terminal 163 may include a conductive rod 170 and may further include a brush 173 which may include a plurality of fine conductive wires. In one embodiment, air terminal 163 may be a brushless terminal. The conductive rod 170 can be inserted into an axial bore extending downwardly from the top end of an uppermost one of mast sections 167. However, the conductive rod 170 may be coupled/connected to the uppermost most one of mast sections 167 via any suitable mechanism and/or technique.

Additionally, the mast sections 167 of the mast assembly 160 (and/or the air terminal 163) may be alodined, anodized, painted, and/or coated with any other protective coating that presents no impediment to the voltage of a lightning flash. Alodining (chemical conversion) is a coating method intended to provide corrosion prevention to aluminum products left unpainted, as well as to improve adhesion of painting processes. Anodizing is the electrochemical oxidation of an aluminum surface designed to produce a stable film of the aluminum's oxide on that surface.

The mast assembly 160 may be supported, for example, by stay lines (or guy wires) 175. In one example, three stay lines 175 may be used to support mast assembly 160. In one example, one end of the stay lines 175 may be connected to an upper region of the mast assembly 160, e.g., about two-thirds of the way up the mast assembly 160, and the other end of the stay lines 175 may be connected to the base assembly 105.

In addition to general field use, the base assembly 105 may be suitable for non-penetrating application, such as, rooftops, non-penetrable surfaces, and other critical surfaces.

The base assembly 105 is preferably capable of supporting an assembled lightning protection system 100 and withstanding wind loads equivalent to about 100 mph (about 161 kph). Further, all components of the modular lightning protection system 100 are preferably corrosion resistant and suitable for indefinite deployment periods in sea coast or other challenging environments.

The function of the base assembly 105 is to provide a easily deployed base structure to support a portable lightning protection system to deter and terminate lighting strikes that may threaten assets and personnel under its cone of protection.

Conventional lightning grounding systems often are ineffective in terminating initial, high frequency, high amplitude initial strikes due to the high impedance of ground conductors. The rise time of the leading edge of strokes is typically on the order of one microsecond or less, equating to an RF frequency in the one to three megahertz range. A typical ground system may have a DC resistance of 5 to 100 ohms, but the impedance in the one to three megahertz range may be many hundreds of ohms, particularly in poor soil.

Base assembly 105 for a portable lightning protection system 100 is designed to have a large base area, e.g., in the range of about 1394 sq. in. to about 8023 sq. in. (with the use of one or more additional conductive plates), equating to a significant capacitance to the substrate on which it is mounted. Thus, a direct connection is provided through capacitive action to the underlying "ground" substrate without the need for wires or conventional grounding. In the case of rock, asphalt, sand, or other poor conductors, base assembly 105 may provide better grounding than a simple driven ground rod. In the usual case, portable lightning protection system 100 may be attached to a conventional ground system to fully terminate low frequency components of the strike. If further capacitance (lower impedance) is desired, one or more additional conductive plates (not shown) may be attached between base beams (e.g., inner horizontal members 120) of the base assembly 105.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A base assembly for a portable lightning protection system comprising:

a. an outer base structure, the outer base structure comprising a plurality of outer horizontal beams attached to one another in an end to end configuration forming a generally closed outer base structure;

b. an inner base structure, the inner base structure comprising a plurality of inner horizontal support brackets attached in an end to end configuration forming a generally closed inner base structure, wherein the inner base structure is formed about a central connection point of the base assembly;

c. radially extending inner horizontal beams each having a first end attachable to a corner region of the outer base structure formed where corresponding ends of two of the plurality of outer horizontal members are attached together, and a second end attachable to one of the central connection point of the base assembly or to one of the inner horizontal support brackets of the inner base structure;

d. a plurality of angled support members each having a first end attachable to one of the radially extending inner horizontal beams and a second end attachable to a base mast section attachable to the base assembly; and e. wherein the radially extending inner horizontal beams, comprise a first set of radially extending inner horizontal beams; and a second set of radially extending inner horizontal beams, wherein the second ends of the first set of inner horizontal beams are attachable to the central connection point, and the second ends of the second set of inner horizontal beams are attachable to the plurality inner horizontal support brackets of the inner base structure.

2. The system of claim 1, wherein the generally closed outer base structure comprises a generally hexagonal shape.

3. The system of claim 1, wherein the generally closed inner base structure comprises a generally triangular shape.

4. The system of claim 1, wherein the second ends of the second set of inner horizontal beams are attachable to about a center point of the inner horizontal support brackets.

5. The system of claim 1, wherein the second end of the angled support members are attachable to radially projecting fins of the base mast section.

6. The system of claim 1, wherein the plurality of outer horizontal beams comprises six outer horizontal beams, and wherein the plurality of radially extending inner horizontal beams comprises six inner horizontal beams.

7. The system of claim 1, wherein each horizontal beam of the second set of radially extending inner horizontal beams are disposed substantially perpendicular to the inner horizontal support bracket to which it is attached to.

8. The system of claim 1, wherein the first set of radially extending inner horizontal beams are disposed in an alternating pattern with the second set of radially extending inner horizontal beams.

9. The system of claim 1, wherein each of the inner horizontal support brackets extend between adjacent horizontal beams of the radially extending inner horizontal beams.

10. The system of claim 1, wherein the base mast section is attachable to the base assembly via a hinge assembly, wherein the hinge assembly comprises a top horizontal plate and a bottom horizontal plate, wherein the top horizontal plate and the bottom horizontal plate are hingedly connected on at least one side thereof.

11. The system of claim 10, wherein the base mast section is attachable to the top horizontal plate of the hinge assembly.

12. The system of claim 1, wherein the plurality of angled support members comprises three angled support members.

13. The system of claim 1, wherein the plurality of angled support members comprises six angled support members.

14. The system of claim 13, wherein three of the six angled support members are attachable to radially projecting fins formed on the base mast section, and the other three of the six angled support members are attachable to the base mast section between adjacent ones of the radially projecting fins.

15. The system of claim 1, wherein each of the plurality of angled support members are at about a 45 degree angle relative to the base mast section and the inner horizontal member to which it is attached.

16. The system of claim 1, further comprising quick connect/disconnect fasteners for attachment of one or more of the plurality of outer horizontal beams, plurality of inner horizontal support brackets, radially extending inner horizontal beams, and/or angled support members.

17. A method of deploying a base assembly for a portable lightning protection system, the method comprising:

a. providing a base assembly for a portable lightning protection system, comprising:

i. an outer base structure, the outer base structure comprising a plurality of outer horizontal beams attached to one another in an end to end configuration forming a generally closed outer base structure;

ii. an inner base structure, the inner base structure comprising a plurality of inner horizontal support brackets attached in an end to end configuration forming a generally closed inner base structure, wherein the inner base structure is formed about a central connection point of the base assembly;

iii. radially extending inner horizontal beams each having a first end attachable to a corner region of the outer base structure formed where corresponding ends of two of the plurality of outer horizontal members are attached together, and a second end attachable to one of the central connection point of the base assembly or to one of the inner horizontal support brackets of the inner base structure;

iv. a plurality of angled support members each having a first end attachable to one of the radially extending inner horizontal beams and a second end attachable to a base mast section attachable to the base assembly; and v. wherein the radially extending inner horizontal beams, comprise a first set of radially extending inner horizontal beams; and a second set of radially extending inner horizontal beams, wherein the second ends of the first set of inner horizontal beams are attachable to the central connection point, and the second ends of the second set of inner horizontal beams are attachable to the plurality inner horizontal support brackets of the inner base structure;

b. assembling the base assembly;

c. connecting the base mast section to the base assembly via the hinge assembly;

d. positioning the base assembly to a desired location and securing in position;

e. grounding the lightning protection system; and f. placing and securing sections of a multi-section conductive mast assembly in an upright position.

18. The method of claim 17, wherein 18(d) is conducted prior to 18(c).

19. The method of claim 17, wherein the base assembly is assembled using quick connect/disconnect fasteners.

* * * * *